United States Patent
Achtelik et al.

(10) Patent No.: US 10,981,672 B2
(45) Date of Patent: Apr. 20, 2021

(54) GROUND STATION DEVICE FOR A PLURALITY OF UNMANNED AIRCRAFT

(71) Applicant: Intel Deutschland GmbH, Neubiberg (DE)

(72) Inventors: Michael Achtelik, Stockdorf (DE); Klaus Doth, Krailling (DE); Daniel Gurdan, Germering (DE); Jan Stumpf, Planegg (DE); Markus Luetzenburger, Maisach (DE); Fabian Oberndorfer, Krailling (DE); Martin Stobbe, Krailling (DE)

(73) Assignee: Intel Deutschland GmbH, Neubiberg (DE)

( * ) Notice: Subject to any disclaimer, the term of this patent is extended or adjusted under 35 U.S.C. 154(b) by 406 days.

(21) Appl. No.: 15/762,812

(22) PCT Filed: Sep. 16, 2016

(86) PCT No.: PCT/EP2016/072003
§ 371 (c)(1),
(2) Date: Aug. 28, 2018

(87) PCT Pub. No.: WO2017/050658
PCT Pub. Date: Mar. 30, 2017

(65) Prior Publication Data
US 2018/0362188 A1  Dec. 20, 2018

(30) Foreign Application Priority Data

Sep. 23, 2015 (DE) .................. 102015116118.4

(51) Int. Cl.
*B64F 1/36* (2017.01)
*B64F 1/00* (2006.01)
(Continued)

(52) U.S. Cl.
CPC ............ *B64F 1/36* (2013.01); *B60L 53/12* (2019.02); *B60L 53/16* (2019.02); *B60L 53/34* (2019.02);
(Continued)

(58) Field of Classification Search
CPC .... B64F 1/36; B64F 1/362; B64F 1/00; B64F 1/222; B64C 2201/201
See application file for complete search history.

(56) References Cited

U.S. PATENT DOCUMENTS 6,868,769 B1  3/2005  Wright
8,424,802 B2 *  4/2013  Tripier-Larivaud .... B64F 1/007
                                                244/114 R
(Continued)

FOREIGN PATENT DOCUMENTS

CN  104816834 A  8/2015
DE  102013004881 A1  9/2014
(Continued)

OTHER PUBLICATIONS

Francesco Cocchioni et al., "Autonomous Navigation, Landing and Recharge of a Quadrotor using Artificial Vision", 2014 International Conference on Unmanned Aircraft Systems (ICUAS), IEEE, 2014, pp. 418-429.
(Continued)

*Primary Examiner* — Magdalena Topolski
*Assistant Examiner* — Marisa V Conlon
(74) *Attorney, Agent, or Firm* — Viering, Jentschura & Partner MBB

(57) ABSTRACT

A ground station device for a plurality of unmanned aircraft, comprising an upper face, which comprises a plurality of receptacles for positioning a plurality of unmanned aircraft, a data interface for connecting the ground station device to a control unit, and a power supply device for charging the (Continued)

unmanned aircraft. The ground station device is designed to be stackable so as to form a stack with at least one other ground station device.

16 Claims, 4 Drawing Sheets

(51) Int. Cl.
*B60L 53/16* (2019.01)
*B60L 53/34* (2019.01)
*B60L 53/12* (2019.01)
*B60L 53/66* (2019.01)
*B64C 39/02* (2006.01)
*H02J 7/00* (2006.01)

(52) U.S. Cl.
CPC ............ *B60L 53/66* (2019.02); *B64C 39/024* (2013.01); *B64F 1/362* (2013.01); *H02J 7/0044* (2013.01); *B60L 2200/10* (2013.01); *B64C 2201/024* (2013.01); *B64C 2201/027* (2013.01); *B64C 2201/042* (2013.01); *B64C 2201/143* (2013.01); *B64C 2201/20* (2013.01); *B64C 2201/201* (2013.01); *Y02T 10/70* (2013.01); *Y02T 10/7072* (2013.01); *Y02T 90/12* (2013.01); *Y02T 90/14* (2013.01)

(56) References Cited

U.S. PATENT DOCUMENTS

| | | | |
|---|---|---|---|
| 8,862,285 B2 | 10/2014 | Wong et al. | |
| 8,899,903 B1* | 12/2014 | Saad | B60L 53/34 414/392 |
| 9,540,121 B2* | 1/2017 | Byers | B64F 1/00 |
| 9,783,075 B2* | 10/2017 | Henry | B60L 53/35 |
| 9,828,094 B2* | 11/2017 | McMillion | D06F 29/00 |
| 10,322,820 B2* | 6/2019 | Husain | H04N 5/2259 |
| 10,453,348 B2* | 10/2019 | Speasl | G08G 5/0082 |
| 2004/0232282 A1 | 11/2004 | Dennis | |
| 2009/0314883 A1 | 12/2009 | Arlton et al. | |
| 2013/0081245 A1* | 4/2013 | Vavrina | B60L 53/51 29/402.08 |
| 2014/0236388 A1 | 8/2014 | Wong et al. | |
| 2014/0249693 A1 | 9/2014 | Stark et al. | |
| 2015/0120094 A1* | 4/2015 | Kimchi | G05D 1/00 701/3 |
| 2016/0009413 A1 | 1/2016 | Lee et al. | |
| 2016/0229299 A1 | 8/2016 | Streett | |
| 2017/0225802 A1* | 8/2017 | Lussier | B60L 53/36 |
| 2019/0070995 A1* | 3/2019 | Cantrell | B64F 1/222 |
| 2019/0270526 A1* | 9/2019 | Hehn | B64F 1/362 |
| 2020/0165007 A1* | 5/2020 | Augugliaro | B64C 39/024 |

FOREIGN PATENT DOCUMENTS

| | | |
|---|---|---|
| EP | 3045393 A1 | 7/2016 |
| GB | 2530626 A | 3/2016 |
| KR | 20130122715 A | 11/2013 |
| WO | 03059735 A2 | 7/2003 |
| WO | 2013055265 A1 | 4/2013 |
| WO | 2014160589 A1 | 10/2014 |
| WO | 2016019978 A1 | 2/2016 |
| WO | 2016130112 A1 | 8/2016 |

OTHER PUBLICATIONS

German Office Action based on application No. 10 2015 116 118.4 (6 pages) dated Sep. 9, 2016 (Reference Purpose Only).
International Search Report based on application No. PCT/EP2016/072003 (6 pages) dated Dec. 21, 2016 (Reference Purpose Only).

* cited by examiner

GROUND STATION DEVICE FOR A PLURALITY OF UNMANNED AIRCRAFT

CROSS-REFERENCE TO RELATED APPLICATION

The present application is a national stage entry according to 35 U.S.C. § 371 of PCT application No.: PCT/EP2016/072003 filed on Sep. 16, 2016, which claims priority from German Patent Application Serial No.: 10 2015 116 118.4 which was filed on Sep. 23, 2015, and is incorporated herein by reference in its entirety and for all purposes.

TECHNICAL FIELD

The present description relates to a ground station device for a plurality of unmanned aircraft, including an upper face which includes at least one receptacle for positioning a plurality of unmanned aircraft, a connector for connecting the ground station device to a control unit, and a power supply device for charging the unmanned aircraft.

BACKGROUND

One way in which unmanned aircraft can be used is in display teams or fleets. Such fleets are increasingly commonly used for research and airshow purposes, for example as light display elements. Such a use is known, for example, from U.S. Pat. No. 8,862,285 B2.

Unmanned aircraft tend to have a controller (auto-pilot), a data interface, a data store for mission parameters and flight paths, a position and altitude control and a rechargeable battery as a power supply. At present, for use in a fleet each unmanned aircraft must be separately supplied with the individually designed flight data for the particular unmanned aircraft. Such a system is described, for example, in US 2014/0249693 A1.

The data can be loaded into the memory of each individual unmanned aircraft manually, by plugging in a cable connection on the ground, by manually attaching a data storage medium (for example an SD memory card) or else via a wireless connection during the operation. In addition, a rechargeable battery that provides the power supply must be charged separately. The battery is charged via the manual replacement of the battery, and this can be taken to a charging station outside of the aircraft. Alternatively, the unmanned aircraft can be manually plugged into a charging device directly, if it is not possible to remove the battery.

In addition, each unmanned aircraft must be permanently connected to a mission and fleet control, usually by means of a PC and a control software, which form and ensure the control and monitoring of the individual unmanned aircraft within the fleet. For this purpose, data must be continuously exchanged between each unmanned aircraft in the fleet and the mission and fleet control. Such a data exchange is also relevant to the detection of status conditions and malfunctions of individual or multiple unmanned aircraft in the fleet.

One consequence of this is that above a certain number n of unmanned aircraft in the fleet, a wireless data communication between the unmanned aircraft and the mission and fleet control or among each other is no longer possible, since the ISM frequency bands for Short Range Devices (SRD) that are available for this purpose and the resulting usable bandwidths for the data communication represent a limit on the maximum number of unmanned aircraft that can be used in the fleet.

In addition, the manual workload for activities such as data exchange via cable interface, attaching a storage medium, maintenance, system monitoring and battery exchange increase with the number of unmanned aircraft in the fleet to such an extent that here also, the necessary deployment of personnel represents the economically viable limit and with it the number of unmanned aircraft in the fleet. A high manual workload also poses a high safety risk due to a high level of possible error sources.

According to the current state of the art, unmanned aircraft are transported in the deactivated state, or in the switched-off state, in transportation holders or containers. In this state there is no possibility of carrying out system tests, data transfers or charging the batteries.

SUMMARY

An advantageous aspect of the present description is to specify an improved ground station device.

This aspect may be achieved by means of a device having the features described in the description. Advantageous non-limiting embodiments may also be obtained from the description.

Accordingly, a ground station device for a plurality of unmanned aircraft is specified, including an upper face, which includes at least one receptacle for positioning a plurality of unmanned aircraft, a connector for connecting the ground station device to a control unit and a power supply device for charging the unmanned aircraft, wherein the ground station device is designed to be stackable so as to form a stack with at least one other ground station device.

Such a ground station device is used as a transport, communications, maintenance and charging station for a plurality of unmanned aircraft. The ground station device is preferably designed as a single part. By means of the connector for connecting the ground station device to a control unit, it is possible to provide a communication in the form of a data connection between the plurality of unmanned aircraft and the control unit, while the unmanned aircraft are located on the ground station device. By means of such a data connection the control unit can, for example, query the system status of the unmanned aircraft. In addition, by means of the data connection the control unit can, for example, load mission data of a scheduled air display into the memory of the particular unmanned aircraft.

Because the ground station device is provided with a power supply, no separate charging facilities for the individual unmanned aircraft are necessary. Therefore, one power supply device is sufficient to charge the plurality of unmanned aircraft, which are located on the upper face of the ground station device. This results in significantly less manual effort being needed to charge the plurality of unmanned aircraft.

The fact that the ground station is designed to be stackable for stacking with at least one other ground station device means that the transport of a plurality of unmanned aircraft can be simplified. Ground station devices stacked on top of one another occupy comparatively little space and, for example, require a small amount of storage space when being transported in a vehicle. The manual transport of stackable ground station devices is also advantageous, since these can be transported using a fork lift truck, for example, wherein two or more stacked ground station devices can be transported at once.

In a non-limiting embodiment the functionality of the ground station device can also be provided in the stacked state. In other words, even if a ground station device is stacked with one or more other ground station devices, it can both charge the unmanned aircraft arranged on the ground station device and provide a data connection between the unmanned aircraft arranged on the ground station device and the control unit. Thus, even in the stacked condition of the ground station device, it is possible to query the system status of the unmanned aircraft arranged on the ground station device. Furthermore, even in the stacked condition of the ground station device it is possible to load mission data onto the unmanned aircraft arranged on the ground station device.

In this way it is possible to load the unmanned aircraft also during their transport and/or to provide a data exchange between the unmanned aircraft and the control unit. Thus, the preparation of the unmanned aircraft for an air display can already be started when the unmanned aircraft are still located on stacked ground station devices.

In a non-limiting embodiment a lower face of the ground station device is designed in such a way as to secure the unmanned aircraft of another ground station device in the stacked condition. Therefore, unmanned aircraft can be held in position between two stacked ground station devices. This favors in particular the conditions for transporting the unmanned aircraft that are arranged between two stacked ground station devices, since the unmanned aircraft are not arranged loosely between the stacked ground station devices and thus have a lesser tendency to be damaged by the action of external forces. Accordingly, relative movements of the unmanned aircraft among themselves, as well as relative movements of the unmanned aircraft with respect to the stacked ground stations, are prevented.

In this way it is possible to ensure that a charging operation of the unmanned aircraft, or a data connection between the unmanned aircraft and the ground station device, is not interrupted. Thus, the unmanned aircraft can be held in position, wherein corresponding charging contacts are not separated.

The secure fixing can be effected, for example, by means of appropriate structures on the lower face of the ground station device. For example, the structures can be designed to be complementary to an upper part of the unmanned aircraft, to receive them and/or secure them in place.

In an extension the data interface is connected to each receptacle of the ground station device. It is therefore possible to provide a data connection between each unmanned aircraft accommodated in a receptacle and the control unit.

Therefore, in order to exchange data with the control unit it is sufficient to arrange an unmanned aircraft in a receptacle. A separate plug connection of the unmanned aircraft is not required for data exchange. The manual effort required for data exchange of one or more unmanned aircraft with a control unit is thereby reduced.

In a further non-limiting embodiment the power supply device includes a power connection and a cable, wherein the power connection is connected to each receptacle via the cable. Thus it is possible to supply each receptacle with power, so that any unmanned aircraft located in a receptacle can be charged.

Therefore, for charging purposes it is sufficient to arrange an unmanned aircraft in a receptacle. A separate plug connection of the unmanned aircraft is not required for charging purposes. The manual effort required for charging one or more unmanned aircraft is thereby reduced.

In a further non-limiting extension, the ground station device has guides for aligning the ground station device relative to at least one other ground station device in the stacked condition. It is thus possible to position ground station devices in a predetermined relative position with respect to each other. This enables the positionally exact holding and securing of unmanned aircraft between two stacked ground stations. The guides can be provided, for example, by means of complementary geometries of the upper and lower faces of the base station device.

In a further non-limiting design, the at least one receptacle is designed in such a way as to position an unmanned aircraft at a predetermined position on the upper face. It is thus possible to ensure that an unmanned aircraft held in the receptacle can be charged. In addition, this makes it possible to ensure that a data connection is provided between the ground station device and the unmanned aircraft arranged in the receptacle. The positioning of the unmanned aircraft in appropriate receptacles also enables the unmanned aircraft to be spaced sufficiently far apart from each other. This ensures that the individual propellers of the respective aircraft are each arranged on the ground station device a sufficient distance apart from propellers of an adjacent unmanned aircraft.

In a further non-limiting embodiment, the at least one receptacle is designed in such a way as to enter into a form-fitting connection to an unmanned aircraft. By means of the form-fitting connection between the unmanned aircraft and the receptacle, sufficient contact can be provided with the power supply and to allow data transmission between the ground station device and the unmanned aircraft. In addition, the form-fitting connection can facilitate the exact positioning of an unmanned aircraft on the ground station device. This can be effected, for example, by means of a complementary design of the geometries of the receptacle and a body of the unmanned aircraft.

The geometry of the receptacle can, for example, taper from the upper face of the ground station device towards the inside of the ground station device. In contrast, the body of the unmanned aircraft can be conically tapered towards its lowest point so that it forms a male part and the receptacle forms a female part. Such geometries facilitate the holding of an unmanned aircraft in the receptacle.

In a non-limiting embodiment the ground station device includes a contactless data interface for providing a data connection between the ground station device and at least one unmanned aircraft. It is thus possible to design the data exchange process between the ground station device and an unmanned aircraft in a manner that causes as little wear as possible. Overall, the contactless data interface enables mission data to be loaded onto the unmanned aircraft from the control unit, and in the opposite direction the status of the unmanned aircraft can be detected by the control unit. The contactless data interface can be designed, for example, in the form of an optical data interface. For example, two optical contact elements are located opposite each other to provide the optical data connection, one optical contact element being arranged in the receptacle and the other optical contact element being arranged on the unmanned aircraft. By arranging the optical contact elements on a coaxial axis of the receptacle and of the unmanned aircraft, it is possible to provide between the base station device and the unmanned aircraft a data connection, which is in a plane parallel to the upper face of the ground station device irrespective of the orientation of the unmanned aircraft.

Overall, the contactless data interface enables a data connection to be provided between the ground station device and an unmanned aircraft by simply placing the unmanned aircraft in the receptacle. A separate connection procedure is therefore unnecessary in order to provide the data connection.

In an extension, the power supply device is designed in such a way that the unmanned aircraft can be supplied with power when there is physical contact between the ground station device and the unmanned aircraft. Accordingly, it is sufficient for the unmanned aircraft to be mounted on the ground station device. Connection of each individual unmanned aircraft to a charging cable is therefore not necessary. The manual effort required to charge the unmanned aircraft can thereby be significantly reduced.

In a further non-limiting embodiment, the power supply device includes a plurality of spring-loaded contacts for contacting one unmanned aircraft each. A spring-loaded contact can promote a secure contacting of an unmanned aircraft. Thus, a corresponding contact force is exerted by the spring, which presses a contact of the power supply device against an unmanned aircraft, in other words, a contact of the unmanned aircraft.

If an unmanned aircraft is arranged on the ground station device, the weight of the unmanned aircraft presses against the spring-loaded contact, compressing the spring. The pre-stressed state of the spring ensures that the contact touches a corresponding mating contact of the unmanned aircraft as long as the unmanned aircraft is arranged on the ground station device. The receptacle thus assumes the function of the pre-positioning of the unmanned aircraft relative to the spring-loaded contact.

In a further non-limiting extension, the power supply device includes means for inductive charging, wherein the means for inductive charging are designed in such a way that unmanned aircraft that are located on the ground station device can be inductively charged.

As a result, it is not necessary to bring charging contacts of the ground station device into contact with charging contacts of the unmanned aircraft. Accordingly, there are lesser demands on the accuracy of the positioning of the unmanned aircraft on the ground station equipment for charging purposes. The orientation of the unmanned aircraft in a plane parallel to the upper face of the ground station device is thus arbitrary. An unmanned aircraft only needs to be positioned in a receptacle of the ground station device, so that a battery of the unmanned aircraft can be inductively charged and/or the unmanned aircraft can be supplied with power.

The aspect referred to above is also solved by means of a system as described in the description. Advantageous non-limiting embodiments may be additionally obtained from the description.

Accordingly, a system is provided, including a control unit, at least one ground station device in accordance with any of the aspects mentioned above and at least one unmanned aircraft, wherein the unmanned aircraft can be supplied with power by means of the ground station device, and wherein the ground station device can provide a data connection between the control unit and the unmanned aircraft. Such a system facilitates the preparation of unmanned aircraft for providing an air display. The supply of power by means of the ground station device reduces the manual effort required to charge the rechargeable batteries of the unmanned aircraft. The provision of a data connection between the control unit and the unmanned aircraft while the unmanned aircraft are located on the ground station device allows a majority of the data to be exchanged between the control unit and the unmanned aircraft before the unmanned aircraft are in the air and a data exchange can only be carried out over a wireless connection. Thus, the data connection provided by the ground station device contributes considerably to relieving the loading of potential additional data connections, in particular a radio link between the control unit and the unmanned aircraft during the air display.

In a further non-limiting embodiment, the control unit can query a status of the unmanned aircraft via the data connection. This has a positive impact on the maintenance of the unmanned aircraft. Thus, the unmanned aircraft do not need to be connected separately for a status query. The unmanned aircraft can instead remain on the ground station device. Even if the unmanned aircraft are arranged on a plurality of stacked ground station devices, for example for transport purposes, by means of the data connection it is possible to query the status of the unmanned aircraft arranged in the stacked ground station devices.

In an extension, mission data can be loaded from the control unit onto the unmanned aircraft via the data connection. It is therefore possible to communicate mission data, for example flight paths, to the unmanned aircraft, namely to load it into the data store of the unmanned aircraft, even before the launch. As a result, it is possible to reduce the data exchange required between the control unit and the unmanned aircraft during the air display. In this way, a significantly larger number of unmanned aircraft can take part in an air display.

The aspect referred to above is also solved by means of a system having the features of claim 16. Accordingly, a system is specified which includes at least two stacked ground station devices in accordance with one of the above aspects, at least one unmanned aircraft and a control unit, wherein the unmanned aircraft is arranged between a lower ground station device and an upper ground station device and is secured by the lower ground station device and the upper ground station device, wherein a rechargeable battery of the unmanned aircraft can be charged in the secured state, and wherein the ground station device can provide a data connection between the unmanned aircraft and the control unit, by means of which a system status of the unmanned aircraft can be queried and the data can be loaded from the control unit onto the unmanned aircraft.

This system enables the functions of the ground station devices still to be accessed even if they are in a stacked condition. If, for example for transport purposes or due to lack of space, the ground station devices are stacked on top of each other and unmanned aircraft are present in the receptacles of the ground station devices, then the unmanned aircraft can still be maintained and, for example, prepared for an upcoming air display mission. Tasks such as charging the batteries of the unmanned aircraft, querying the system status and uploading mission data into the memory of the unmanned aircraft are thus also possible when the unmanned aircraft are located on stacked ground station devices.

In addition, it is possible to connect the power supply devices of stacked ground station devices to one another. In this way it is sufficient to connect only one ground station device to an external power source. This ground station device then supplies power to its neighboring ground station device.

Even the data interfaces of stacked ground station devices can be connected to each other, so that an external connection is sufficient to provide the data connection between the control unit and the stacked ground station devices.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the disclosed embodiments. In the following description, various embodiments described with reference to the following drawings in which.

DETAILED DESCRIPTION

Figure 1:
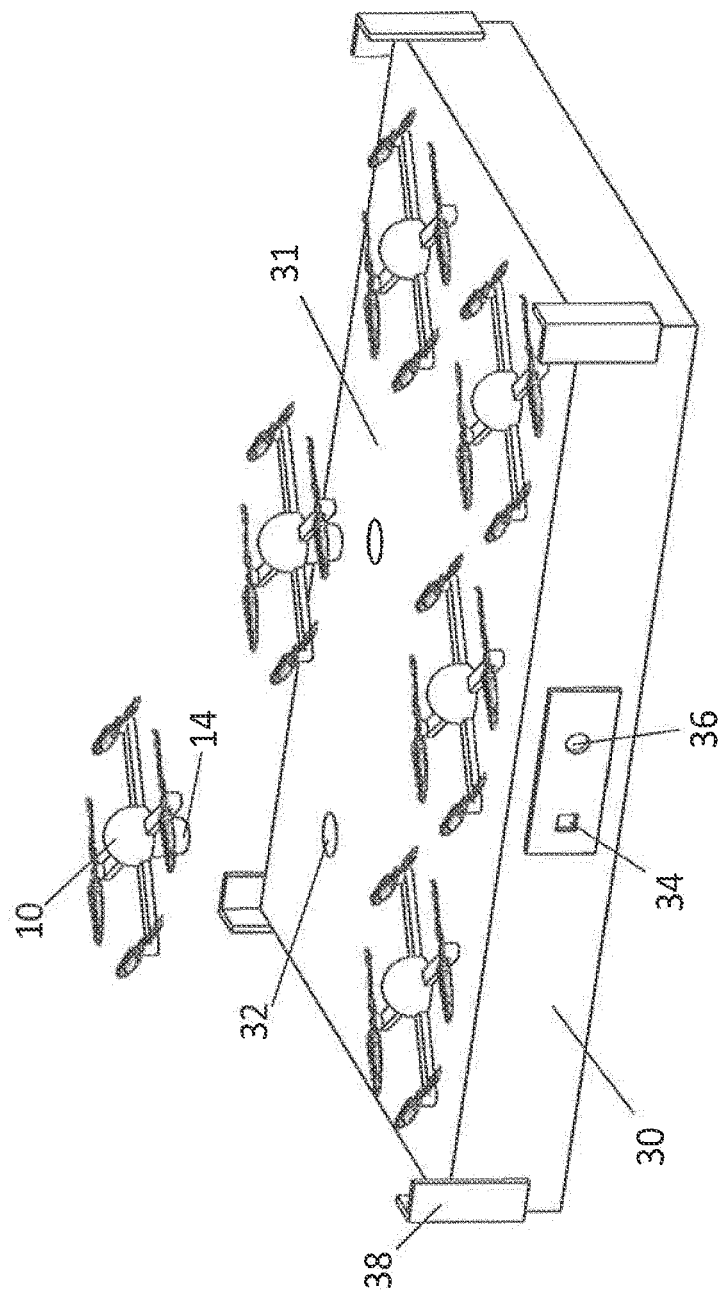
FIG. 1 a schematic perspective view of a ground station device with unmanned aircraft, FIG. 2 a cross-sectional view of the ground station device of FIG. 1, FIG. 3 a schematic cross-sectional view of a system consisting of two stacked ground station devices in accordance with the preceding figures, and FIG. 4 a schematic representation of a system consisting of ground station devices, unmanned aircraft and a control unit.

The word "exemplary" is used herein to mean "serving as an example, instance or illustration". Any embodiment or design described herein as "exemplary" is not necessarily to be construed as preferred or advantageous over other embodiments or designs.

In the following, non-limiting exemplary embodiments are described by reference to the figures. In these, identical, similar or functionally equivalent elements are designated with identical reference numerals. In order to avoid redundancy, a repeated description of these elements will not be given in all cases in the following description.

FIG. 1 shows a ground station device 30, on which unmanned aircraft 10 are arranged. The ground station device 30 thus simultaneously assumes the function of a transport, communication, maintenance device and charging station for the unmanned aircraft. FIG. 1 shows a total of six unmanned aircraft 10, wherein four of the unmanned aircraft 10 are arranged on the ground station device 30 and two of the unmanned aircraft 10 are flying directly above the base station device 30.

On an upper face 31 of the ground station device 30, six receptacles 32 are arranged. The receptacles 32 are used to guide the unmanned aircraft 10 into a predefined position on the ground station device 30. The lateral circumferential surface of the receptacles 32 is cylindrically designed. Overall, the receptacle 32 represents a blind hole. Alternatively, the lateral circumferential surface of the receptacle 32 can also have a conical shape, in other words, it tapers in the direction of the inside of the ground station device. The unmanned aircraft 10 each have a lower section 14, which tapers in its protruding direction. This tapered, protruding lower section 14 facilitates the positioning of an unmanned aircraft 10 in a receptacle 32.

At the corners of the upper face 31, vertically protruding guides 38 are arranged, which are used to stack another ground station device on the ground station device 30 such that they are aligned flush. The guides shown in FIG. 1 are formed by angled elements, which can receive the vertical edges of another ground station device. Alternatively, the guides can also be provided in the form of pins, ribs, fully or partially circumferential grooves, and so on. In this case, the lower face of the base station device includes the corresponding complementary mating part. If the guide on the upper face is provided, for example, in the form of a pin, then the lower face has a drilled hole for receiving such a pin.

The ground station device 30 has a data interface 34, via which a data connection to a control unit can be provided. The data interface can be, for example, a network port for an Ethernet, via which the ground station devices 30 can be connected to a control unit, for example in the form of a server, PC or laptop. In addition, the ground station device 30 includes a power connection 36, via which voltage can be applied to the ground station device 30 for supplying power to the unmanned aircraft 10 and for charging batteries of the unmanned aircraft 10.

Figure 2:
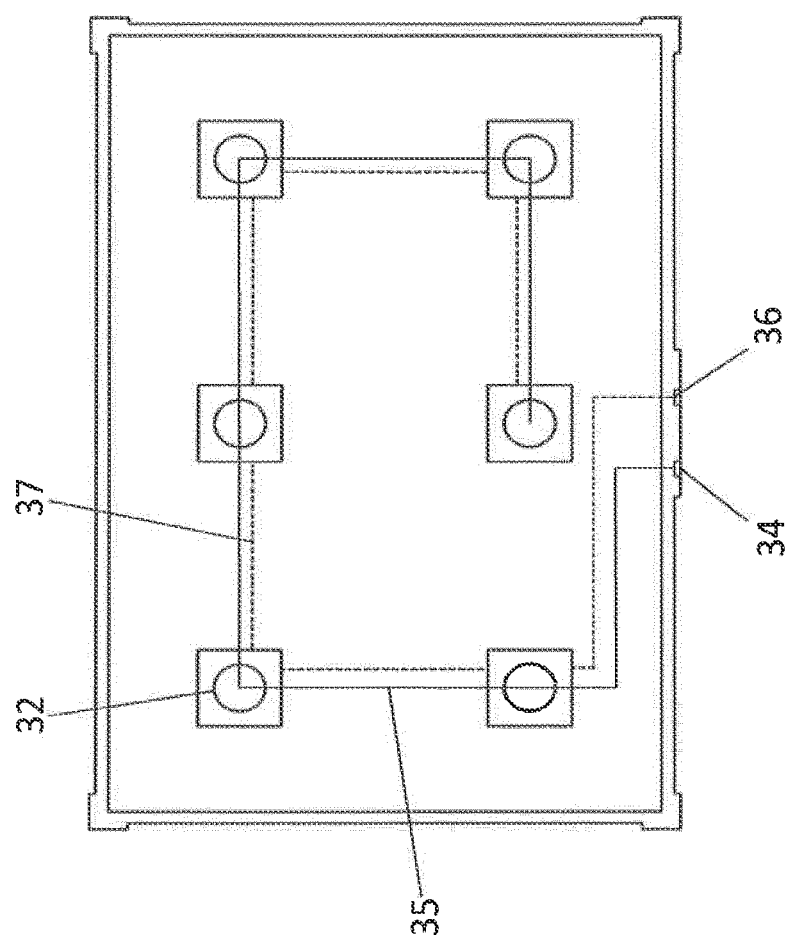

FIG. 2 shows a horizontal cross-sectional view of the ground station device 30 of FIG. 1. In the sectional view six receptacles 32 are visible. A network cable 35 runs from the data interface 34 through the ground station device 30, wherein the network cable 35 is routed past each of the six receptacles 32. The network cable 35 provides a data interface at each receptacle 32, via which a data connection can be provided between the control unit and an unmanned aircraft. Alternatively, a separate network cable can be routed from the data interface to each of the receptacles.

In addition, a cable 37 runs from the power connection 36 through the base station device 30, which supplies power to the six receptacles 32 of the ground station device 30. This cable 37 has corresponding contacts at the level of the receptacles 32, by means of which an unmanned aircraft located in the receptacle 32 is supplied with power and its battery can be charged. Alternatively, separate cables can also be provided, which supply power to the individual receptacles.

Figure 3:
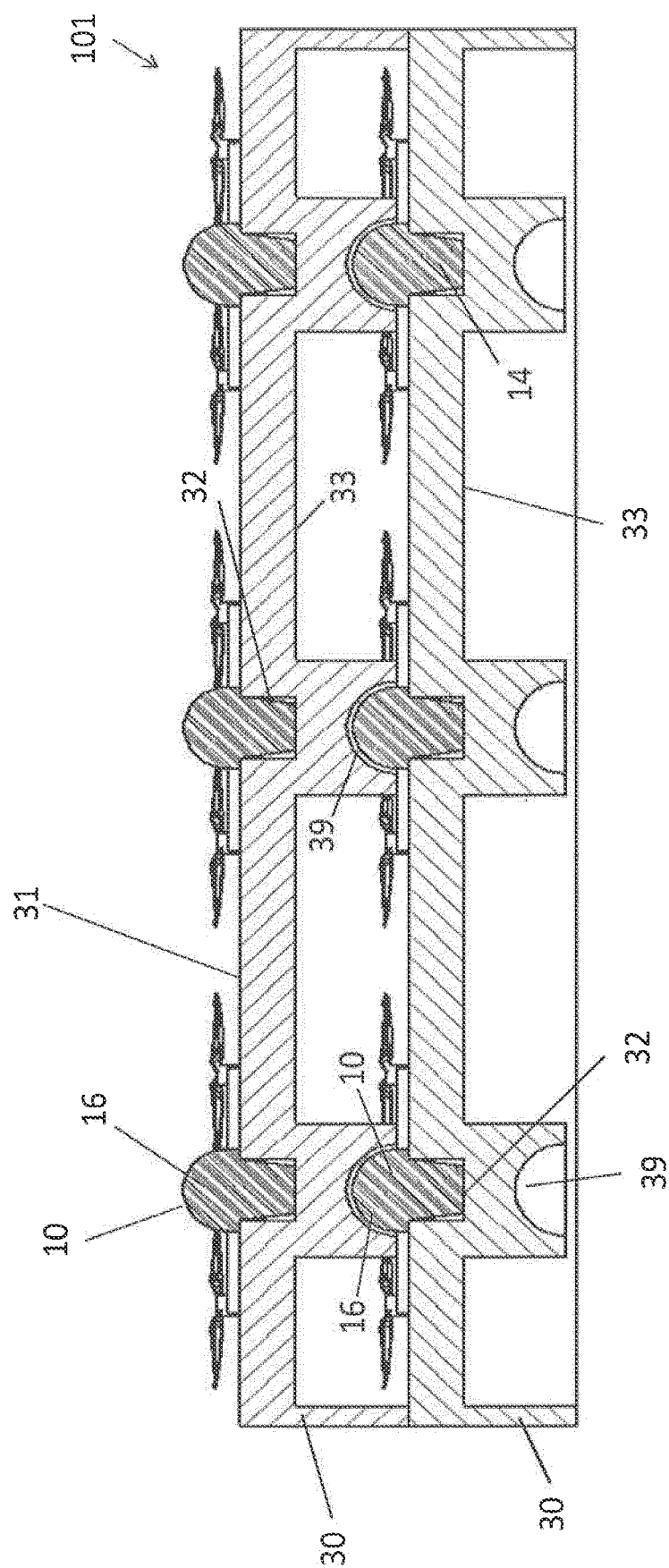

FIG. 3 shows a system 101, which includes two ground station devices 30 and a plurality of unmanned aircraft 10. In the system 101 shown in FIG. 3, a lower ground station device 30 and an upper ground station device 30 can be distinguished. From the cross-sectional view shown in FIG. 3, it is apparent that unmanned aircraft 10 are located both in the receptacles 32 of the upper ground station device 30 and in the receptacles 32 of the lower ground station device 30. The ground station devices 30 are stacked on top of each other by means of guides (not shown), in such a way that their outer surfaces are aligned flush.

The lower faces 33 of the ground station devices have structures 39. These structures 39 are designed to be complementary to an upper section 16 of the unmanned aircraft 10. It is apparent from FIG. 3 that the structures 39 on the lower face 33 of the upper ground station device 30 secure the unmanned aircraft 10 in the receptacles 32 of the lower ground station device 30. Accordingly, in the stacked condition the unmanned aircraft 10 are held firmly between two ground station devices. As a result, in the stacked condition the unmanned aircraft 10 are protected against external effects, such as vibrations.

FIG. 3 also shows that the structures 32 have the form of a cylindrical blind hole. The lower section 14 of the unmanned aircraft 10 is tapered, which facilitates the insertion of the lower section 14 into the receptacles 32.

The unmanned aircraft 10 in the arrangement shown in FIG. 3 are connected to the data interface 34 and the power connection 36 from FIG. 2. Accordingly, the unmanned aircraft 10 shown in FIG. 3 are connected via a data connection to a control unit, so that system and status information for the individual unmanned aircraft can be queried almost synchronously and mission parameters and flight path data can be loaded into the system of an unmanned aircraft 10.

Figure 4:
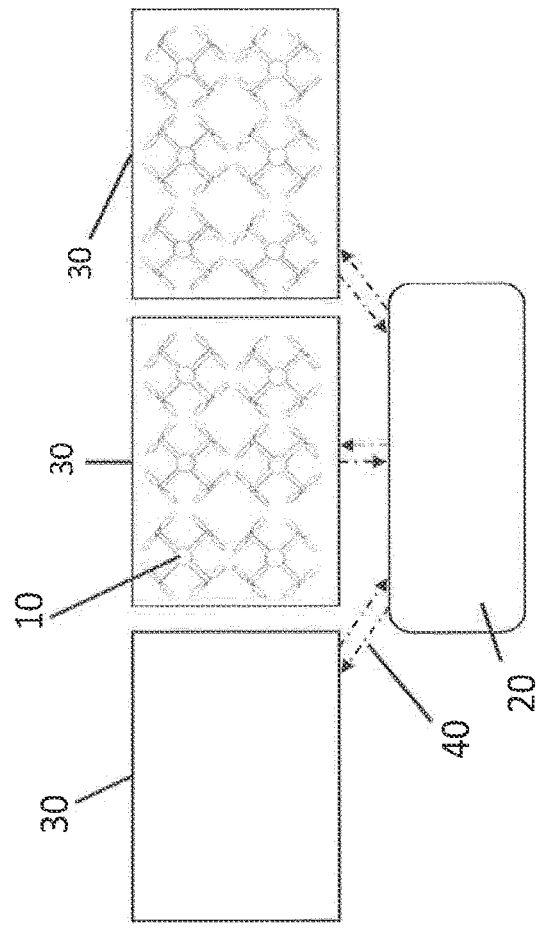

FIG. 4 shows a schematic diagram of a system 1 for providing an air display, in other words an animation, for urban areas. The system 1 includes unmanned aircraft 10, which include a lighting means, by means of which the unmanned aircraft can perform an air display. The system 1 also includes ground station devices 30, which act as the launch and/or landing platform, transportation device, charging station and interface for data exchange for the unmanned aircraft 10. The system 1 shown in FIG. 4 includes three ground station devices 30. Alternatively, depending on the number of unmanned aircraft 10, any number of ground station devices 30 can be provided. The ground station devices 30 shown in FIG. 4 can each accommodate six unmanned aircraft 10.

Alternatively, the ground station devices can also be designed in such a way that they can accommodate more than or less than six unmanned aircraft 10. Thus, ground station devices for accommodating one or a maximum of two unmanned aircraft 10 are also possible, for example, if these are particularly large unmanned aircraft. Alternatively, ground station devices 30 are also possible, which can accommodate 10, 20 or more unmanned aircraft 10. Such ground station devices are suitable, for example, in the case of particularly small unmanned aircraft.

The system 1 also includes a control unit 20, for example in the form of a server, PC or laptop. The control unit 20 can communicate via a first data connection 40 with the unmanned aircraft 10 located on the ground station devices 30. In this scenario the control unit 20 loads the mission data for all flight paths into the data store of every unmanned aircraft associated with a ground station device 30. In addition, the control unit 20 can query the identifiers, GPS data and the system state of the unmanned aircraft 10 located on a ground station device 30.

If the unmanned aircraft 10 become separated from the ground station device 30, which is the case, for example, at the time of launch of an unmanned aircraft 10, the data connection 40 between the unmanned aircraft 10 and the control unit 20 is disconnected. The unmanned aircraft separated from the ground station device 30 can communicate with the control unit 20 via a further data connection.

If applicable, all individual features shown in the various embodiments can be combined and/or interchanged without departing from the scope of the invention.

While the invention has been particularly shown and described with reference to specific embodiments, it should be understood by those skilled in the art that various changed in form and detail may be made therein without departing from the spirit and scope of the invention as defined by the appended claims. The scope of the invention is thus indicated by the appended claims and all changes which come within the meaning and range of equivalency of the claims are therefore intended to be embraced.

LIST OF REFERENCE NUMERALS

1 system
101 system
10 unmanned aircraft
14 lower portion
16 upper portion
20 control unit
30 ground station device
31 upper face
32 receptacle
33 lower face
34 data interface
35 network cable
36 power connection
37 cable
38 guide
39 structure
40 data connection

The invention claimed is:

1. A ground station device for a plurality of unmanned aircraft, comprising
   an upper face, which comprises a plurality of receptacles for positioning a plurality of unmanned aircraft,
   a lower face, which comprises a plurality of receptacles formed opposite to the plurality of receptacles of the upper face, the plurality of receptacles of the lower face allowing for positioning of upper sections of the plurality of unmanned aircraft,
   a data interface for connecting the ground station device to a control unit, and
   a power supply device for charging the unmanned aircraft, wherein the ground station device is stackable so as to form a stack with at least one other ground station device.

2. The ground station device as claimed in claim 1, wherein the functionality of the ground station device is provided in a stacked condition.

3. The ground station device as claimed in claim 1, wherein the lower face is configured to secure the plurality of unmanned aircraft in receptacles of another ground station device in the stacked condition.

4. The ground station device as claimed in claim 1, wherein the data interface is connected to each receptacle of the ground station device.

5. The ground station device as claimed in claim 1, wherein the power supply device comprises a power connection and a cable, wherein the power connection is connected to each receptacle via the cable.

6. The ground station device as claimed in claim 1, wherein the ground station device has guides for aligning the ground station device relative to at least one other ground station device in a stacked condition.

7. The ground station device as claimed in claim 1, wherein the at least one receptacle is configured to position at least one unmanned aircraft at a predetermined position on the upper face.

8. The ground station device as claimed in claim 1, wherein the at least one receptacle is configured to enter into a form-fitting connection to an unmanned aircraft.

9. The ground station device as claimed in claim 1, wherein the ground station device comprises a contactless data interface for providing a data connection between the ground station device and at least one unmanned aircraft.

10. The ground station device as claimed in claim 1, wherein the power supply device is configured to supply power to the unmanned aircraft when there is physical contact between the ground station device and the unmanned aircraft.

11. The ground station device as claimed in claim 10, wherein the power supply device comprises a plurality of spring-loaded contacts for contacting one unmanned aircraft each.

12. The ground station device as claimed in claim 1, wherein the power supply device is configured for inductive charging, wherein the power supply device is configured to inductively charge the unmanned aircraft when located on the ground station device.

13. A system comprising a control unit, at least one ground station device comprising:
   an upper face, which comprises a plurality of receptacles for positioning a plurality of unmanned aircraft,
   a lower face, which comprises a plurality of receptacles formed opposite to the plurality of receptacles of the upper face, the plurality of receptacles of the lower face allowing for positioning of upper sections of the plurality of unmanned aircraft, a data interface for connecting the ground station device to a control unit, and a power supply device for charging the unmanned aircraft,
wherein the ground station device is stackable so as to form a stack with at least one other ground station device, wherein the lower face is configured to secure the plurality of unmanned aircraft in receptacles of the at least one other ground station device, and at least one unmanned aircraft, wherein the unmanned aircraft is supplied with power by means of the ground station device, and wherein the ground station device is provided a data connection between the control unit and the unmanned aircraft.

14. The system as claimed in claim 13, wherein the control unit is configured to query a status of the unmanned aircraft via the data connection.

15. The system as claimed in claim 13, wherein mission data is loaded from the control unit onto the unmanned aircraft via the data connection.

16. A system comprising at least two ground station devices stacked on top of one another, each ground station comprising:

an upper face, which comprises a plurality of receptacles for positioning a plurality of unmanned aircraft, a lower face, which comprises a plurality of receptacles formed opposite to the plurality of receptacles of the upper face, the plurality of receptacles of the lower face allowing for positioning of upper sections of the plurality of unmanned aircraft, a data interface for connecting the ground station device to a control unit, and a power supply device for charging the unmanned aircraft,
wherein the ground station device is stackable so as to form a stack with at least one other ground station device;

at least one unmanned aircraft and a control unit, wherein the unmanned aircraft is arranged between a lower ground station device and an upper ground station device and is secured by means of the receptacles of the lower ground station device and the plurality of receptacles of the upper ground station device, wherein a rechargeable battery of the unmanned aircraft is charged in the secured state, and wherein the ground station device is provided a data connection between the unmanned aircraft and the control unit, by means of which a system status of the unmanned aircraft is queried and data is loaded from the control unit onto the unmanned aircraft.

* * * * *